United States Patent [19]

Fabbri Corsarini

[11] Patent Number: 5,350,145
[45] Date of Patent: Sep. 27, 1994

[54] TENSIONING STRUCTURE PARTICULARLY FOR CARRYALL BARS ON MOTOR VEHICLES HAVING NO DRIPRAIL

[75] Inventor: Luciano Fabbri Corsarini, Lonato, Italy

[73] Assignee: Ilma S.r.l. Industria Lavorazioni Meccaniche Autoaccessori, Bornato Cazzago San Martino, Italy

[21] Appl. No.: 974,448

[22] Filed: Nov. 12, 1992

[30] Foreign Application Priority Data

Nov. 29, 1991 [IT] Italy .................... MI91U001042

[51] Int. Cl.⁵ .................................................. B60R 9/00
[52] U.S. Cl. ............................ 248/201; 224/42.45 R; 224/314; 224/329; 248/503
[58] Field of Search ............... 248/225.31, 231.6, 500, 248/503, 505, 510, 201; 224/329–331, 314, 42.45 R

[56] References Cited

U.S. PATENT DOCUMENTS

| | | | |
|---|---|---|---|
| 4,688,706 | 8/1987 | Thulin | 224/329 |
| 4,705,198 | 11/1987 | Kamaya | 224/329 |
| 4,809,943 | 3/1989 | Taschero | 224/329 X |
| 4,995,538 | 2/1991 | Marengo | 224/329 |
| 5,104,020 | 4/1992 | Arvidsson et al. | 224/329 X |
| 5,226,570 | 7/1993 | Pedrini | 224/329 |

FOREIGN PATENT DOCUMENTS

| | | | |
|---|---|---|---|
| 273480 | 7/1988 | European Pat. Off. | 224/330 |
| 2551646 | 2/1977 | Fed. Rep. of Germany | 224/331 |
| 216092 | 11/1941 | Switzerland | 224/331 |

Primary Examiner—Ramon O. Ramirez
Assistant Examiner—Derek J. Berger
Attorney, Agent, or Firm—Guido Modiano; Albert Josif; Daniel O'Byrne

[57] ABSTRACT

The tensioning structure for carryall bars on motor vehicles having no driprail, has supporting brackets for a carryall bar which can be mutually connected by means of a metallic cable having terminals at its ends. The terminals can be engaged in accommodation seats defined in the brackets. An end of the cable may be threaded for screw thread engagement with the terminal, whereby to adjust the length of the cable.

1 Claim, 2 Drawing Sheets

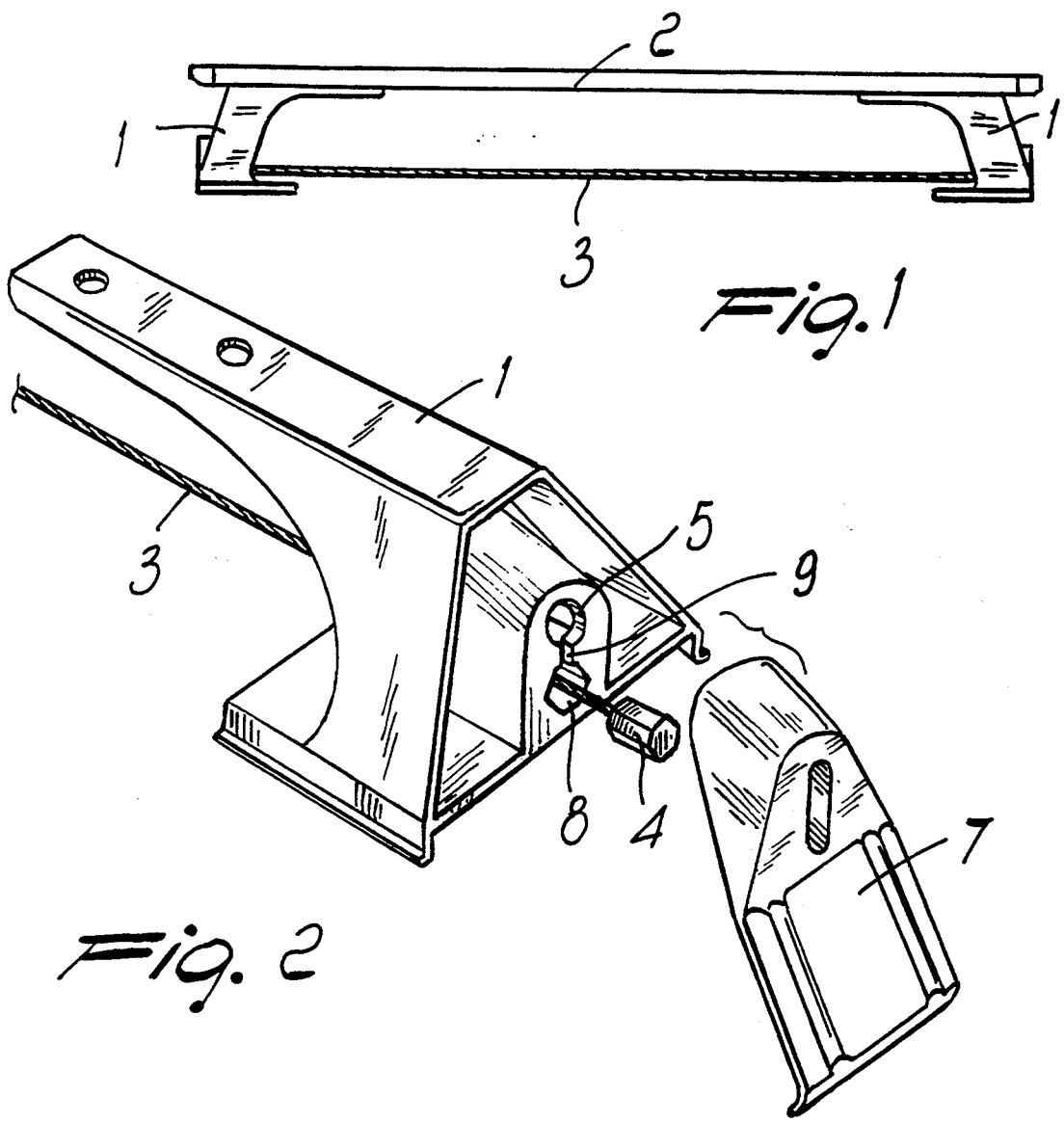
Fig.1
Fig. 2
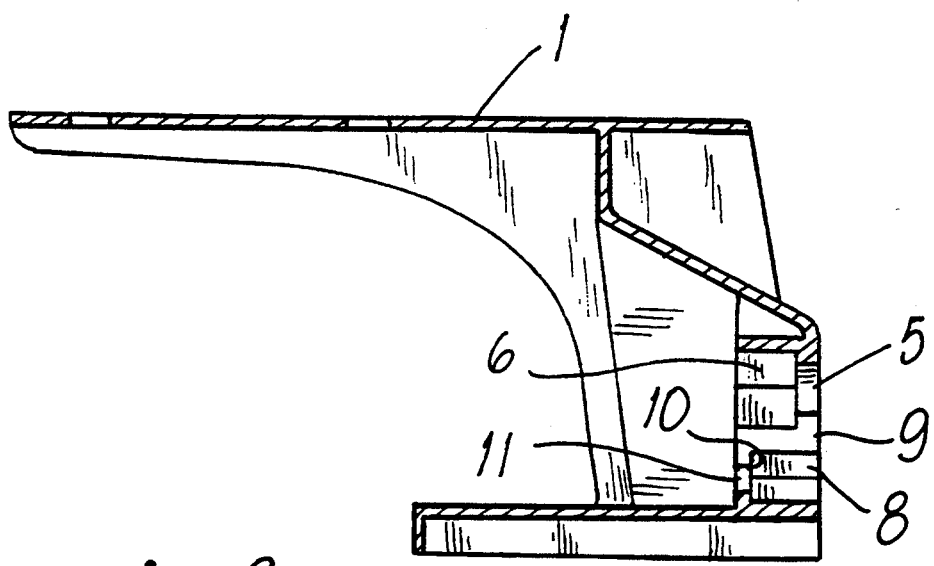
Fig.3

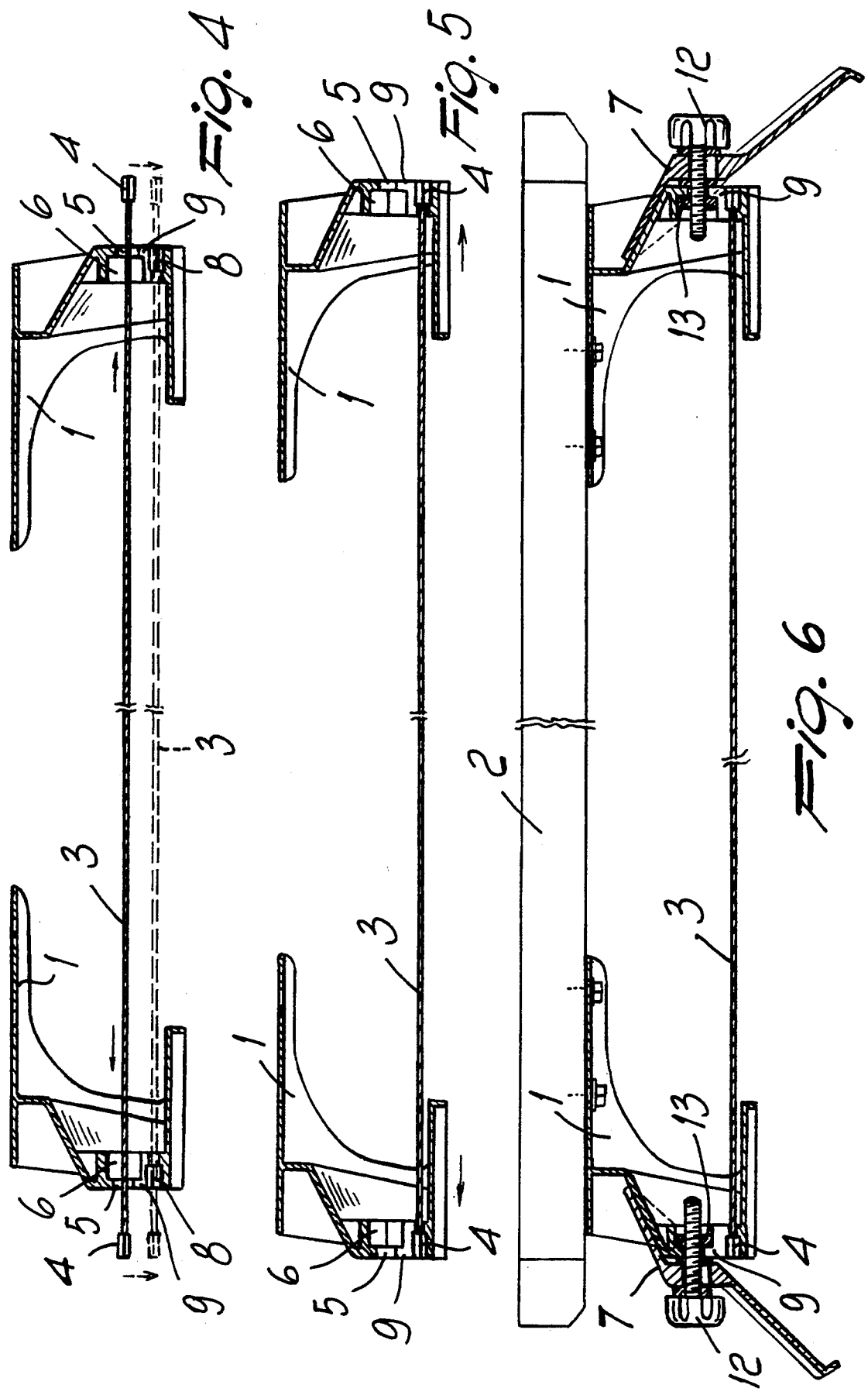

TENSIONING STRUCTURE PARTICULARLY FOR CARRYALL BARS ON MOTOR VEHICLES HAVING NO DRIPRAIL

BACKGROUND OF THE INVENTION

The present invention relates to a tensioning structure particularly for carryall bars on motor vehicles having no driprail.

As is known, in order to install carryall bars on motor vehicles having no driprail it is necessary to provide an element for the mutual connection of the brackets of the carryall bar in order to oppose the tendency which brackets usually have to move mutually apart when loads of any kind are placed on cross-members or carryall bars.

On motor vehicles having no driprail, the fixing of the brackets is in fact ensured by jaws for engaging lateral portions of the motor vehicle itself.

These connecting elements are usually constituted by rigid metallic strips, tubes, drawn elements or bars, usually covered with plastics, which are coupled to each bracket. Said strips or the like, despite solving the above described technical problem, have considerable disadvantages.

They in fact entail the need to provide packages of considerable size, since each strip is as long as the distance between the brackets for the particular motor vehicle on which they must be installed, and they thus require every long packages. This problem, as is evident, affects the storage and shipping costs, since these are light but bulky packages.

Furthermore, they cannot be adjusted in length with respect to the different dimensions and distances which can be found on motor vehicles of different types and models.

SUMMARY OF THE INVENTION

The aim of the present invention is to eliminate or substantially reduce the problems described above by providing a tensioning structure particularly for carryall bars on motor vehicles having no driprail, which allows to substantially reduce the volume occupied by known strips.

Within the scope of the above aim, an object of the present invention is to provide a tensioning structure which can be adjusted in order to adapt to any motor vehicle on which it is used.

Not least object of the present invention is to provide a tensioning structure which is relatively easy to manufacture and competitive in cost.

This aim, these objects and others which will become apparent hereinafter are achieved by a tensioning structure particularly for carryall bars on motor vehicles having no driprail, characterized in that it comprises supporting brackets for a carryall bar which can be mutually connected by means of a metallic cable having, at its ends, terminals which can be engaged in accommodation seats provided in said brackets.

BRIEF DESCRIPTION OF THE DRAWINGS

Further characteristics and advantages of the present invention will become apparent from the description of a tensioning structure particularly for carryall bars on motor vehicles having no driprail, illustrated only by way of non-limitative example in the accompanying drawings, wherein:

FIG. 1 is a lateral elevation view of a structure according to the invention;

FIG. 2 is a perspective view of a bracket, with an end of a cable being inserted and a jaw for engaging a roof of a motor vehicle;

FIG. 3 is a sectional lateral elevation view of a bracket;

FIG. 4 is a sectional lateral elevation view of a first step of the assembly of the structure according to the invention;

FIG. 5 is a sectional lateral elevation view of a second step of the assembly of the structure according to the invention; and FIG. 6 is a sectional lateral elevation view of a third step of the assembly of the structure according to the invention.

DESCRIPTION OF THE PREFERRED EMBODIMENTS

With reference to the above figures, a tensioning structure particularly for carryall bars on motor vehicles having no driprail comprises supporting brackets 1 for a carryall bar 2; said brackets can be mutually connected by means of a metallic cable 3 having, at its ends, terminals 4 which can be engaged in accommodation seats defined in the brackets 1.

Each bracket 1 is provided with a hole 5 for the accommodation of fixing means, usually composed of a screw or Allen screw 12 and of a nut 13 insertable in a usually hexagonal recess 6 of a jaw 7 for engaging a motor vehicle roof, said recess being arranged above the accommodation seat 8 of the respective terminal 4.

The accommodation seat 8 and the hole 5 are mutually connected by means of a slot 9 which allows the simple insertion of the respective terminal 4 in the respective accommodation seat 8.

Each accommodation seat 8 has an abutment 10, usually constituted by a hole 11 whose dimensions are similar to those of the cable 3, which is defined on the bottom of the accommodation seat 8 and against which the respective terminal abuts in order to apply tension to the metallic cable 3.

The metallic cable 3 can be made of steel, possibly covered by a layer of protective plastic material.

In a first embodiment, in order to adjust the length of the cable 3, at least one end of said cable 3 has a surface thread on which a respective terminal 4 engages. The thread allows to adjust the useful length of said cable 3.

In a second embodiment, a terminal 4 can have a grub screw inserted in an internally threaded seat to adjust the length of the cable 3 which can be stretched between the brackets 1.

In a third embodiment, the metallic cable 3 has an end whose surface is threaded and having a surface thread on which a respective terminal 4 engages; said terminal is internally provided with a coupling thread to adjust the length of the cable 3, .and furthermore has a grub screw which is inserted in an internally threaded seat and locks said terminal 4 on the cable 3 in a preset position selected by means of the coupling between the thread of the cable 3 and the thread of the terminal 4.

Assembly is briefly as follows: the terminals 4 of the cable 3, possibly adjusted in length by means of one of the above described solutions, are inserted in the holes 5, FIG. 4, before fixing the brackets 1 on the roof of the motor vehicle and are passed, through the slot 9, into the accommodation seat 8.

The brackets 1 are then mutually spaced in order to abut the terminals 4 against the abutments 10, FIG. 5, and then the brackets 1 are fixed to the roof of the motor vehicle.

Finally, the carryall bar 2 is fixed to the brackets 1, which are then locked (FIG. 5) on the roof of the motor vehicle by means of the jaws 7 in a per se known manner.

The use of a metallic cable advantageously allows to eliminate bulky packages, thus significantly reducing shipping and storage costs.

Furthermore, conveniently, the possibility of adjusting the length of the cable allows to use cables of pre-standardized length instead of having to produce a very large number of cables for different motor vehicle types.

It has been observed from practical tests that the present invention achieves the intended aim and objects, constituting a tensioning structure which is flexible and easy to assemble.

In practice, the materials employed, as well as the dimensions, may be any according to the requirements.

I claim:

1. Tensioning structure particularly for carryall bars on motor vehicles having no driprail comprising;
    supporting brackets for a carryall bar;
    accommodation seats provided in said supporting brackets;
    a metallic cable having ends;
    terminals connected to said ends of said metallic cable and engageable in said accommodation seats, said metallic cable mutually connecting said supporting brackets;
    an accommodation hole formed in each of said supporting brackets;
    means for fixing a jaw for coupling to a motor vehicle roof accommodated in said accommodation hole in each of said supporting brackets;
    a slot connecting said accommodation hole formed in each of said supporting brackets to one of said accommodation seats.

* * * * *